US011577112B2

(12) United States Patent
Talbi et al.

(10) Patent No.: US 11,577,112 B2
(45) Date of Patent: Feb. 14, 2023

(54) ASBESTOS WASTE DESTRUCTION AND VALORIZATION METHOD

(71) Applicants: Université de Montpellier, Montpellier (FR); CENTRE NATIONAL DE LA RECHERCHE SCIENTIFIQUE, Paris (FR); ENSCM—ECOLE NATIONALE SUPERIEURE DE CHIMIE, Montpellier (FR)

(72) Inventors: Gaël Talbi, Montpellier (FR); Olivier Cambon, Villetelle (FR); Martine Cambon, Villetelle (FR)

(73) Assignees: UNIVERSITÉ DE MONTPELLIER, Montpellier (FR); CENTRE NATIONAL DE LA RECHERCHE SCIENTIFIQUE, Paris (FR); ENSCM—ECOLE NATIONALE SUPERIEURE DE CHIMIE, Montpellier (FR)

( * ) Notice: Subject to any disclaimer, the term of this patent is extended or adjusted under 35 U.S.C. 154(b) by 333 days.

(21) Appl. No.: 16/640,126

(22) PCT Filed: Aug. 21, 2018

(86) PCT No.: PCT/FR2018/052086
§ 371 (c)(1),
(2) Date: Feb. 19, 2020

(87) PCT Pub. No.: WO2019/038502
PCT Pub. Date: Feb. 28, 2019

(65) Prior Publication Data
US 2021/0154514 A1 May 27, 2021

(30) Foreign Application Priority Data
Aug. 24, 2017 (FR) ..................................... 17/57840

(51) Int. Cl.
| | |
|---|---|
| *A62D 3/36* | (2007.01) |
| *B09B 3/00* | (2022.01) |
| *C01B 33/12* | (2006.01) |
| *C01B 33/24* | (2006.01) |
| *C01B 39/50* | (2006.01) |
| *A62D 101/41* | (2007.01) |

(52) U.S. Cl.
CPC .............. *A62D 3/36* (2013.01); *B09B 3/0066* (2013.01); *C01B 33/126* (2013.01); *C01B 33/24* (2013.01); *C01B 39/50* (2013.01); *A62D 2101/41* (2013.01)

(58) Field of Classification Search
None
See application file for complete search history.

(56) References Cited

U.S. PATENT DOCUMENTS

| | | | |
|---|---|---|---|
| 4,401,636 A | 8/1983 | Flowers | |
| 5,562,585 A * | 10/1996 | Godesberg | ............... A62D 3/36 405/129.25 |
| 6,391,271 B1 | 5/2002 | Debailleul | |
| 2008/0145310 A1* | 6/2008 | Breuninger | ............... B01J 20/18 423/705 |
| 2008/0264302 A1* | 10/2008 | Azui | ........................ C09D 1/00 106/711 |
| 2011/0101267 A1 | 5/2011 | Carpena et al. | |
| 2011/0315660 A1* | 12/2011 | Yu | .......................... B82Y 40/00 436/72 |
| 2018/0256930 A1* | 9/2018 | Poggi | .................... C01B 33/126 |

FOREIGN PATENT DOCUMENTS

| | | |
|---|---|---|
| CN | 101048342 A | 10/2007 |
| CN | 101670268 A | 3/2010 |
| CN | 101792184 A | 8/2010 |
| CN | 102112243 A | 6/2011 |
| FR | 2 930 736 A1 | 11/2009 |
| JP | 109110514 A | 4/1997 |
| JP | 2009215144 A | 9/2009 |
| WO | 88/10234 A1 | 12/1988 |
| WO | 2009138704 A3 | 6/2010 |
| WO | 2010147208 A1 | 12/2010 |

OTHER PUBLICATIONS

International Search Report dated Jan. 23, 2019 in corresponding International application No. PCT/FR2018/052086; 4 pages.

* cited by examiner

*Primary Examiner* — Sheng H Davis
(74) *Attorney, Agent, or Firm* — Maier & Maier, PLLC

(57) ABSTRACT

A method for destructing and valorizing an asbestos waste including the steps of: determining the asbestos mineralogical group contained in the waste, performing a treatment on the waste which includes of: an acid treatment when the waste comprises only a chrysotile, a base treatment when the waste comprises only an amphibole, the acid treatment followed by the base treatment when the asbestos waste includes a mixture of a chrysotile and an amphibole, and valorizing at least one of the products obtained on completion of the performing of the treatment. An embodiment also concerns a treatment of a chrysotile waste through an acid treatment followed by a thermal treatment.

9 Claims, 3 Drawing Sheets

ASBESTOS WASTE DESTRUCTION AND VALORIZATION METHOD

FIELD

The invention concerns a method for destructing and valorizing asbestos waste.

BACKGROUND

The asbestos is a family of fibrous mineral materials which is split into the following two mineralogical groups: the serpentines groups and the amphiboles group. These two asbestos mineralogical groups have different structures and chemical natures.

The serpentine contains one single asbestos variety which is the chrysotile (also known under the name of «white asbestos»). This is why, in the present application, the term «chrysotile» will be used to refer to the serpentines asbestos group. The chrysotile covers the following three polytypes mineral species:

clinochrysotile,
orthochrysotile, and
parachrysotile.

The chemical formula of the chrysotile is: $3\,MgO.2SiO_2$. It comprises two layers of oxides:

the $1^{st}$ layer is composed by $SiO_4$ tetrahedrons, and
the $2^{nd}$ layer is composed by $MgO_6$ octahedrons.

Because of the difference in size between $MgO_6$ and $SiO_4$, the $MgO_6$ layer induces a bending of the structure which leads to the chrysotile having a tubes structure where the $MgO_6$ layer is the outer layer.

The chrysotile represents about 94% of the global market of asbestos.

The group of amphiboles is composed by the following 5 asbestos varieties:

amosite (also known under the name «brown asbestos»);
crocidolite (also known under the name «blue asbestos»);
tremolite;
actinolite; and
anthophyllite.

These asbestos varieties differ from one another by their chemical composition.

The structure of the amphiboles is composed by a series of double chains ($Si_4O_{11}$) parallel to the axis c. The $MO_6$ layers (with M selected from Mg, Fe and Na) are stacked between $SiO_2$ layers.

The asbestos is a fibrous material that has been known for more than 2000 years and the rise in the production thereof started in 1877 in Quebec. Throughout the last century, millions of tons of asbestos fibers have been extracted and have been used in various fields such as those of construction and textile materials. The interest for asbestos fibers lies on the fact that it consisted of minerals that have insulating properties, do not burn, withstand chemical aggressions and have a high mechanical tensile strength. Thus, the asbestos has been:

used for the thermal insulation of hoses, for insulation,
incorporated in compositions of composites materials such as fibro-cements (for the manufacture of hoses or plates), binders (for example glues and paints), fibro-polymers (for example for the manufacture of electric sheaths).

The most common application of asbestos lied in its incorporation in cement compositions for the obtainment of fibro-cement (also known under the name of «asbestos-cement» or «cement-asbestos»). It consisted of a material constituted by a complex of asbestos fibers scattered in a hydraulic binder which is cement. It has served to produce numerous products such as plates, slabs, anti-noise walls, corrugated sheet metals, tiles, hoses serving to rainwater drainage, evacuation hoses of chimneys conduits, vents. This use represented 95% of the uses of asbestos.

However, it is known that asbestos is a harmful material. Since the 1980s-1990s, its use is prohibited in numerous countries. Indeed, the asbestos microscopic particles may reach the pulmonary alveoli. The inhalation of these particles is hazardous and is the cause of numerous cancers cases. As example, the asbestos has been extensively used in France until its prohibition in 1997 because of its adverse effects on human health.

This is why, the asbestos disposal, as well as the treatment of the asbestos wastes have become important social issues. The research of new treatment means is urgent in order to avoid any risk of exposure.

Furthermore, with regards to the tons of asbestos wastes that will be generated, it is essential to provide effective treatment solutions in order to make these wastes inert and transform them with methods that are economic and applicable on industrial scale.

The treatments of the asbestos wastes known to date consist of vitrification or burying methods.

The burying method is a method for storing the wastes consisting in putting them in quarantine to avoid the propagation thereof. This does not eliminate them and does not enable the valorization thereof in an industrial scale. This solution does not solve the problem of hazardousness of the asbestos thus buried. In addition, the lack of burying sites becomes critical.

The vitrification, in particular using a plasma torch, totally destroys the asbestos fibers so as to obtain a slag, that is to say an inert glass material which can be reused, for example, in the construction or road works field (embankments for roads). This treatment solution has the drawbacks of being energy-intensive and requiring a specific, expensive installation having to withstand temperatures in the range of 1000° C. to 1400° C. Furthermore, this installation requires very high safety measures for its users. Finally, the vitrification is a source of pollutions.

Moreover, there is a method for biological treatment of asbestos wastes which is currently under study. This method is not yet perfectly developed and does not allow for a total destruction of the asbestos.

Thus, it comes out from the related art that the solutions for treating and destroying the asbestos wastes are not fully satisfactory.

SUMMARY

The present invention is intended to overcome the deficiencies of the asbestos wastes treatment methods known in the related art by providing a method for destructing and valorizing said wastes which is ecological, economic, rapid and perfectly applicable on an industrial scale.

Indeed, the inventors of the present invention have developed a method for destructing and valorizing asbestos wastes which, after at least one treatment step, comprises a valorization step allowing valorizing in one or several different way(s) the products obtained on completion of the treatment step. The inventors propose a very effective and economic solution for using the asbestos wastes, and that in a virtuous cycle fashion.

In the context of the present invention, by «asbestos waste», it should be understood a waste which may be:

a homogeneous waste, namely a waste which contains the asbestos pure mineral without any additional material in its structure. In other words, it consists of crystallized natural asbestos fibers; or a heterogeneous waste, namely a waste which contains asbestos and another compound (for example: cement, gypsum or fibers of alkaline earth silicates known by the acronym «AES» standing for «Alkaline Earth Silicate»).

The asbestos waste may be in the following forms:

a free form or in other words in a brittle form. For example, it consists of flocking or insulation wastes;

a bonded form or in other words in a non-brittle form. In particular, it consists of the fibro-cement based wastes mentioned hereinabove.

Thus, a first object of the invention is a method for destructing and valorizing an asbestos waste, which is characterized in that it comprises at least the following steps of:

a) determining the asbestos mineralogical group(s) contained in said waste, said group being selected from a chrysotile and an amphibole, b) performing at least one treatment on said asbestos waste, said treatment being:

an acid treatment when the asbestos waste comprises only a chrysotile, said acid treatment consisting in the immersion of the asbestos waste in a strong acid solution, at a temperature of at most 100° C., so as to obtain an acid solution and a solid comprising a mesoporous silica, a base treatment when the asbestos waste comprises only an amphibole, said base treatment consisting in the immersion of the asbestos waste in a solution of a strong base in a hermetically sealed medium so as to obtain a base solution containing dissolved silica, said acid treatment followed by said base treatment when the asbestos waste comprises a mixture of a chrysotile and an amphibole, so as to obtain after said acid treatment an acid solution and a solid mixture containing a mesoporous silica and the unaltered amphibole, said solid mixture being separated from the acid solution to be subjected to said base treatment so as to obtain a base solution containing dissolved silica, c) valorizing at least one of the products obtained on completion of step b) of the treatment.

The valorization method according to the invention has the advantage of destructing and valorizing in a perfectly effective manner the asbestos waste, as the treatment is adapted according to the result of the determination of the asbestos mineralogical group(s) contained in said waste.

Furthermore, the method according to the invention solves the problem of the hazardousness of the asbestos wastes as it destroys them during the treatment step.

Finally, the valorization of the asbestos method is optimal. On completion of the destruction and valorization method, the waste has been transformed into one or several product(s) which have an added value from an industrial and economic perspective and which can be used in numerous applications detailed hereinafter.

Indeed, step c) may consist of one of the following valorizations considered separately or in any combination thereof:

using the mesoporous silica obtained on completion of the acid treatment for the entrapment and filtering of molecules;

using the mesoporous silica obtained on completion of the acid treatment as a silicon precursor for the synthesis of a zeolite;

selectively extracting or isolating ions present in the acid solution obtained on completion of the acid treatment;

using the base solution obtained on completion of the base treatment for the production of a hydrated calcium silicate type material;

using the base solution obtained on completion of the base treatment for the synthesis of a zeolite.

In an embodiment of the invention, the asbestos waste is an asbestos cement waste (or in other words a fibro-cement waste) or a gypsum-based asbestos flocking. Indeed, as recalled hereinabove, the incorporation of asbestos in cement compositions represented 95% of asbestos uses. Thus, tons of asbestos cement wastes are to be treated. The invention is perfectly suitable for solving the problem of the destruction of cement asbestos wastes, and that in an effective, ecological, economic manner and in an industrial scale.

At step a) of the method, the determination of the mineralogical group(s) contained in the asbestos waste may be carried out by any technique within the reach of those skilled in the art. For example, it may consist of the X-ray diffractometry technique, the scanning electron microscopy technique and the Fourier-transform infrared spectroscopy technique.

Step b) of the method according to the invention enables the destruction of the asbestos waste.

At step b), when an acid treatment is performed, the structure of the chrysotile is destroyed by dissolution of the brucite layer of formula $Mg(OH)_2$ contained therein. A mesoporous silica is obtained. This means that this silica comprises amorphous (namely non-crystallized) silica nanotubes. On completion of the acid treatment, the fibrous structure of the chrysotile is not eliminated. The fibers obtained after the acid treatment are fibers (or nanotubes in other words) of amorphous silica.

Advantageously, the acid solution contains at least one strong acid.

Preferably, it contains at least one strong monoacid. For example, the monoacid may be selected from nitric acid ($HNO_3$) and hydrochloric acid (HCl). Preferably, it consists of nitric acid. These strong monoacids are particularly suitable because the ions derived from the destruction of the wastes will not precipitate with the nitrate ($NO_3^-$) and chloride ($Cl^-$) ions brought by the acid (the ions derived from the destruction of the wastes will remain in solution). Furthermore, they are not expensive and are easy to handle in accordance with safety measures.

In another embodiment of the invention, the acid solution may contain sulfuric acid or phosphoric acid. However, these acids are to be avoided if the asbestos waste is an asbestos cement waste. Indeed, the cement waste contains calcium and magnesium which can precipitate in the form of $CaSO_4$ and $MgSO_4$ if the acid solution contains sulfuric acid or calcium and magnesium phosphate if the solution contains phosphoric acid.

In another embodiment, an acid solution containing fluoride ($F^-$) ions may also be used leading to the destruction of the cement matrix and of the asbestos irrespective of its nature. However, it may be not recommended to use this acid type for obvious safety reasons known to those skilled in the art.

This is why, when the waste is an asbestos cement waste, during the acid treatment, it is preferably that the solution is a hydrochloric acid or nitric acid solution. During this acid treatment, the cement matrix is dissolved.

Advantageously, the concentration of the acid of the acid solution is comprised between 2 mol/L and 11 mol/L, preferably it is lower than 4 mol/L for economic reasons.

During the acid treatment, the temperature is comprised between the ambient temperature (that is to say about 20° C.) and 100° C., preferably between 50° C. and 80° C.

Thus, the acid treatment is carried out in soft conditions, namely at a barely high temperature below 100° C. and at the atmospheric pressure.

In an embodiment of the invention, the acid treatment is carried out in the presence of ultrasounds. This has the advantage of accelerating the kinetics of dissolution of the brucite layer contained in the chrysotile and also lowering the acid treatment temperature (for example down to the ambient temperature), and that depending on the initial cohesion of the asbestos waste to be destroyed and valorized.

The duration of the acid treatment may be comprised between 2 hours and 10 days, preferably between 2 hours and 4 days.

Furthermore, during the acid treatment, the carbonic gas ($CO_2$) that is released may be trapped by bubbling in a lime-water solution.

At step b), a base treatment is performed when the asbestos waste contains an amphibole. Indeed, the amphibole has a structure in which the layers containing Mg and Fe are trapped between two silica layers that is very difficult to destroy in the acid medium. During the base treatment, the silica is dissolved. Thus, a base solution containing the dissolved silica is obtained.

The strong base may be selected from soda (NaOH) and potash (KOH). Preferably, it consists of NaOH.

Advantageously, the concentration of the base of the base solution is comprised between 2 mol/L and 15 mol/L, preferably between 6 mol/L and 15 mol/L, more preferably between 7 mol/L and 15 mol/L, even more preferably between 7 mol/L and 10 mol/L.

During the base treatment, the temperature is comprised between 100° C. and 250° C., preferably between 150° C. and 200° C.

The duration of the base treatment may be comprised between 2 hours and 10 days, preferably it is shorter than 5 days.

Advantageously, the base treatment is carried out in an autoclave, for example an autoclave coated with polytetrafluoroethylene, or in any other closed device allowing implementing the above-described conditions.

Thus, the base treatment is carried out in hydrothermal conditions. «By hydrothermal conditions», it should be understood in the context of the present application that the base treatment is carried out in a closed enclosure in subcritical conditions allowing reaching temperatures above the boiling point of the base solution that would be obtained in an open enclosure (that is to say normal atmospheric pressure conditions).

When the asbestos waste comprises a mixture of a chrysotile and an amphibole, during the acid treatment, the structure of the chrysotile is destroyed but the amphibole remains which is not destroyed in the acid medium for the reasons explained hereinabove. This is why, in this embodiment of the invention, the asbestos waste is subjected to a treatment consisting in the acid treatment followed by the base treatment as described hereinabove. On completion of the base treatment, a base solution containing the dissolved silica is obtained.

On completion of the acid treatment, the mesoporous silica and the amphibole (namely the unaltered amphibole) that are present in the solid form in the acid solution may be collected by any technique within the reach of those skilled in the art, for example by filtering. The base treatment is then performed on the solid mixture containing this mesoporous silica and this amphibole thus collected. Both the mesoporous silica and the amphibole are then dissolved. Thus, a base solution containing dissolved silica is obtained.

Step b) of the treatment that has been detailed hereinabove depending on whether the asbestos waste comprises a chrysotile and/or an amphibole has the advantages of being adapted to be carried out with very common and inexpensive chemical compounds (for example a nitric acid, hydrochloric acid or soda solution). Furthermore, the operational conditions are conventional in the chemistry field and are therefore perfectly within the reach of those skilled in the art. In addition, advantageously, no hazardous byproduct is generated.

In an embodiment of the invention, the acid treatment may be followed by a thermal treatment so as to obtain a silica the walls of the nanotubes of which are amorphous or crystallized and non-hydrated.

The thermal treatment consists in a heating to a temperature of at least 600° C. of the mesoporous silica obtained on completion of the acid treatment.

On completion of the acid treatment, the mesoporous silica present in the acid solution is a solid which can be collected by any technique within the reach of those skilled in the art, for example by filtering. This solid obtained on completion of the acid treatment is a hydrated mesoporous silica. Moreover, the acid solution may also be valorized. The thermal treatment is then performed on this mesoporous silica thus collected.

The temperature of the thermal treatment is at least 600° C. so that the silica nanotubes are totally dehydrated. If the temperature of the thermal treatment is comprised between 600 and 700° C., the walls of the nanotubes remain amorphous. Beyond a temperature of 700° C., the walls of the nanotubes start crystallizing to reach a better crystallinity at 800° C. This is why, depending on the temperature of the thermal treatment to which the mesoporous silica would have been subjected, there is obtained a silica the walls of the nanotubes of which are non-hydrated and which may be amorphous or crystallized. These two forms of the structure of the walls, namely amorphous and crystallized, are both interesting, because they allow using the silica in different applications. Thus, the temperature of the thermal treatment may be adapted depending on the considered application of the silica thus obtained.

The duration of the thermal treatment may be comprised between 4 hours and 48 hours, preferably between 4 hours and 24 hours.

The thermal treatment step may be carried out in a conventional thermal treatment furnace which is perfectly within the reach of those skilled in the art, the mesoporous silica being placed in thermally-stable crucibles.

During the thermal treatment step, there is a loss of water that is bonded to the siliceous structure of the nanotubes of the mesoporous silica. This water loss is accompanied by a progressive rearrangement of the $SiO_4$ tetrahedrons therebetween. This rearrangement causes at a temperature higher than 700° C. a crystallization of the walls of the nanotubes and a loss of the porosity of the walls of the nanotubes by their condensation. In other words, there is a reorganization of the matter under temperature; which leads to the crystallization of the walls of the nanotubes.

Thus, during the thermal treatment, the walls of the amorphous silica nanotubes are rebuilt by condensing.

Indeed, during the acid treatment, the brucite layers have been eliminated; which has left very large spaces between the silica sheets which constitute the wall of the nanotubes. There are obtained nanotubes with a diameter of about 3.2 nm but with barely structured walls and therefore a large specific surface area (that is to say the surface developed by non-contiguous sheets) and a large pore volume. When the thermal treatment is carried out, these sheets reconnect again with one another with the formation of $SiO_4$ tetrahedrons; which results a reduction of the specific surface area, the total volume also decreases but the center of the tube (in other words the diameter of the tube) increases.

On completion of the thermal treatment, there is obtained a silica the walls of the nanotubes of which are amorphous or crystallized and non-hydrated. The size of the pores of this silica is comprised between 3 and 6 nm, preferably comprised between 3 and 4 nm for a thermal treatment temperature lower than 700° C., and between 5 and 6 nm for a thermal treatment temperature higher than 700° C.

The different ways for valorizing the product(s) obtained on completion of the treatment step b) are detailed hereinbelow.

A first valorization concerns the mesoporous silica.

At step c), the mesoporous silica obtained on completion of the acid treatment may be used by taking advantage of the presence of the amorphous silica nanotubes comprised thereby by trapping therein molecules with large sizes (that is to say larger than 0.5 nm), for example biological molecules (polyatomic molecule such as anesthetics, drugs and other antiseptics). The mesoporous silica obtained on completion of the acid treatment may find applications in the medical field to purify biological liquids (blood, for example).

Thanks to the nanotubes, the mesoporous silica may also be used as a means for filtering molecules, in particular pollutant molecules, either in the environmental field or in the medical field (pesticides, urea, creatinine for example).

It may also be considered to valorize the mesoporous silica obtained on completion of the acid treatment by using it as a silicon precursor for the synthesis of a zeolite.

Thus, when an acid treatment has been performed, step c) may consist in using the mesoporous silica for the entrapment or the filtering of molecules and/or as a silicon precursor for the synthesis of a zeolite.

In an embodiment of the invention in which the asbestos waste contains a chrysotile and the acid solution is a nitric acid solution, the mesoporous silica is used to synthesize a nitrate-cancrinite type zeolite of formula $Na_8[Al_6Si_6O_{24}](NO_3)_2\cdot 4H_2O$.

The zeolite thus obtained has an excellent purity of the synthesized product with a very good compliance with the structural model. The structure is composed by small cages forming a helix.

This zeolite is particularly advantageous for its adsorption properties in particular in the field of pollutant ions filtering. Furthermore, the nitrate ions contained in the structure of this zeolite confer to it particular ionic exchange properties due to specific structural properties (such as the size of the cages for exchanging ions) and thermo-elastic behaviors (capacity of deformation of the network) promoting the insertion of different ions.

Thus, an asbestos waste containing chrysotile is valorized so as to obtain a nitrate-cancrinite type zeolite which may be used in numerous applications thanks to its adsorption properties.

For example, this zeolite is used in the environmental field where it serves as a trap for pollutant ions such as Pb, Cd, Sr and Hg.

The nitrate-cancrinite may be synthesized by implementing these steps:

There are provided precursors whose amounts are detailed in mass percentages expressed with respect to the total mass of said precursors:

silicon precursor: between 7.8% and 8.2% of the mesoporous silica obtained on completion of the acid treatment;

aluminum precursor: between 4.1% and 4.5% of $Al_2O_3\cdot Na_2O$;

sodium nitrate precursor: between 76.0% and 76.3% of $NaNO_3$;

between 11.2% and 11.6% of sodium hydroxide: NaOH.

In a $1^{st}$ beaker filled with 35 mL of distilled water: the strong base, the mesoporous silica and then after a few minutes the sodium nitrate precursor, are added in that order.

In a $2^{nd}$ beaker, the aluminum precursor is dissolved in 5 mL of distilled water.

The two mixtures are added in a $3^{rd}$ vessel. An instantaneous gelation occurs. The vessel is closed and stirred very strongly.

Afterwards, this vessel is placed in the oven at a temperature comprised between about 80° C. and about 90° C. for a duration comprised between 2 hours and one day, preferably one day. Then filtering (for example with a cellulose-based filter-paper or with a centrifuge for solid-liquid separation) and washing with distilled water are performed. The product thus obtained, which is a nitrate-cancrinite type zeolite, is dried. Drying may be carried out in the oven or by means of vacuum drawing or else by combining these two means, that is to say drying under temperature with vacuum drawing.

The nitrate-cancrinite may also be synthesized from other precursors such as $Al(NO_3)_3$, $KNO_3$ and KOH. Furthermore, the final chemical formula may contain potassium ions in partial or total substitution of the sodium ions. Those skilled in the art will be capable of modifying the mass percentages expressed hereinabove accordingly in the case of said nitrate-cancrinite synthesized hereinabove.

The synthesis of a zeolite, in particular a nitrate-cancrinite type zeolite, is perfectly within the reach of those skilled in the art who will be capable of determining the amounts of precursors, distilled water required for the synthesis, as well as the conditions of temperature, stirring and duration of the synthesis in order to obtain a zeolite.

The example of carrying out the synthesis of a nitrate-cancrinite type zeolite that has been detailed hereinabove is intended to illustrate the present patent application and does not constitute, in any case, a limitation to the invention.

A second valorization concerns the acid solution obtained on completion of the acid treatment.

On completion of the acid treatment, numerous ions are present in large amounts in the acid solution. This is why, at step c), it is possible to valorize the acid solution obtained on completion of step b) by extracting these ions either simultaneously which will lead to the obtainment of a mixture of oxides that can be directly reused by the cement industry for example, or by isolating some of them in a selective manner.

Thus, when an acid treatment has been performed, step c) may consist in selectively extracting or isolating ions present in the acid solution obtained on completion of the acid treatment.

Through a monitored neutralization (namely by addition of a base such as soda or potash under controlled pH), it is possible to make the ions contained in the acid solution precipitate successively. Thus, solid phases containing the oxides of the ions present in the solution are successively obtained (through successive filtering); the calcium oxide CaO being the last oxide to precipitate at a pH equal to 11. The magnesium may also be collected for various applications such as metallurgy, the aeronautical industry or for the energy field.

This valorization of the acid solution obtained after the acid treatment may also be implemented in the embodiment of the invention in which the mesoporous silica is subjected afterwards to a thermal treatment as described hereinabove.

A third valorization concerns the base solution obtained on completion of the base treatment.

A base solution of the dissolved silica obtained after the base treatment may be used for the synthesis of a zeolite as detailed hereinabove, in particular a nitrate-cancrinite type zeolite. Indeed, the base solution may be used to make the medium for the synthesis of the zeolite very basic; which is essential for the success of this synthesis.

Furthermore, said base solution essentially containing the dissolved silica, may serve in the production of hydrated calcium silicate type materials (also known under the abbreviation «CSH»). These materials are particularly suitable for the entrapment of pollutant ions. Thus, the base solution is valorized by using it for the synthesis of hydrated calcium silicate intended for the entrapment of pollutants.

Thus, when a base treatment has been performed, step c) may consist in using the base solution obtained on completion of the base treatment for the production of a hydrated calcium silicate type material and/or for the synthesis of a zeolite.

A fourth valorization concerns the silica obtained on completion of the thermal treatment.

When the asbestos waste contains a chrysotile and that it has been subjected to an acid treatment followed by a thermal treatment as described hereinabove, there is obtained a silica the walls of the nanotubes of which are amorphous or crystallized and non-hydrated. This silica may be valorized by using it as a phases stabilization means in chemical reactions.

Indeed, by the effect of confinement of the reactants in the nanotubes, the phases of the reactive medium are stable. This phases stability could not be obtained in normal temperature and pressure conditions. This phases stabilization property may find applications in the microelectronics field.

In addition, the size of the pores of at least 5 nm is particularly suitable for filtering molecules. Thus, the silica obtained on completion of the thermal treatment can be used as a depolluting means by filtering molecules, for example pharmaceutical molecules.

Moreover, as mentioned hereinabove, the use of the chrysotile is predominant since it represents about 94% of the global market of asbestos. This is why, it is essential to provide a destruction and valorization method that is perfectly suitable for this asbestos mineralogical group.

During their researches on the destruction and valorization of asbestos wastes, the inventors have discovered in a quite surprising manner that it was very advantageous to perform a thermal treatment on chrysotile having been subjected to an acid treatment. Indeed, this allows obtaining a silica the walls of the nanotubes of which are amorphous or crystallized and non-hydrated. This constitutes a very interesting structure for numerous applications of this product, and that as detailed hereinabove.

This is why, another object of the present invention is a method for treating a waste containing a chrysotile, which is characterized in that it comprises at least the following steps of:

a) providing a waste containing a chrysotile;

b) carrying out an acid treatment on said waste so as to obtain a mesoporous silica, said acid treatment consisting in the immersion of the chrysotile waste in a strong acid solution at a temperature of at most 100° C.;

c) carrying out a thermal treatment consisting in a heating of the mesoporous silica at a temperature of at least 600° C.

On completion of the thermal treatment, there is obtained a silica having nanotubes whose walls are amorphous or crystallized and non-hydrated.

The acid treatment of step b) may be carried out in the same manner as that of the asbestos waste destruction and valorization method that has been detailed hereinabove.

The thermal treatment of step c) may be carried out in the same manner as that of the asbestos waste destruction and valorization method that has been detailed hereinabove.

Thus, during the thermal treatment, there is a reorganization of the silica matter, or in other words a rearrangement, which causes a crystallization of the walls of the nanotubes and a loss of the porosity of the wall of the nanotubes by condensation thereof.

The silica obtained on completion of step c) may be valorized in different ways as described hereinabove. In particular, it may be used as a phases stabilization means in chemical reactions or as a filtering means.

BRIEF DESCRIPTION OF THE DRAWINGS

The invention will be better understood using the following detailed description, with reference to the appended drawing representing, as a non-limiting example, the experimental results obtained from three asbestos wastes and a chrysotile waste.

DETAILED DESCRIPTION

I—Experiments on Asbestos Cement Wastes:

In a $1^{st}$ series of experiments, the destruction and valorization method according to the invention that has been described hereinabove has been implemented on the following three asbestos cement wastes:

the $1^{st}$ asbestos cement waste was a roof tile;
the $2^{nd}$ asbestos cement waste was a hose gasket;
the $3^{rd}$ asbestos waste was a flocking sample comprising a mixture of gypsum, asbestos and fibers of alkaline earth silicates.

First of all, in order to determine the mineralogical group(s) contained therein, these three wastes have been analyzed by X-ray diffractometry with a diffractometer commercialized by the company BRUCKER under the commercial name «D2 PHASER» using the radiation of the Kα spectral line of copper (λ=1.54 Å) after filtering by a nickel filter. The measurement step was 0.014° in 2θ.

Figure 1:
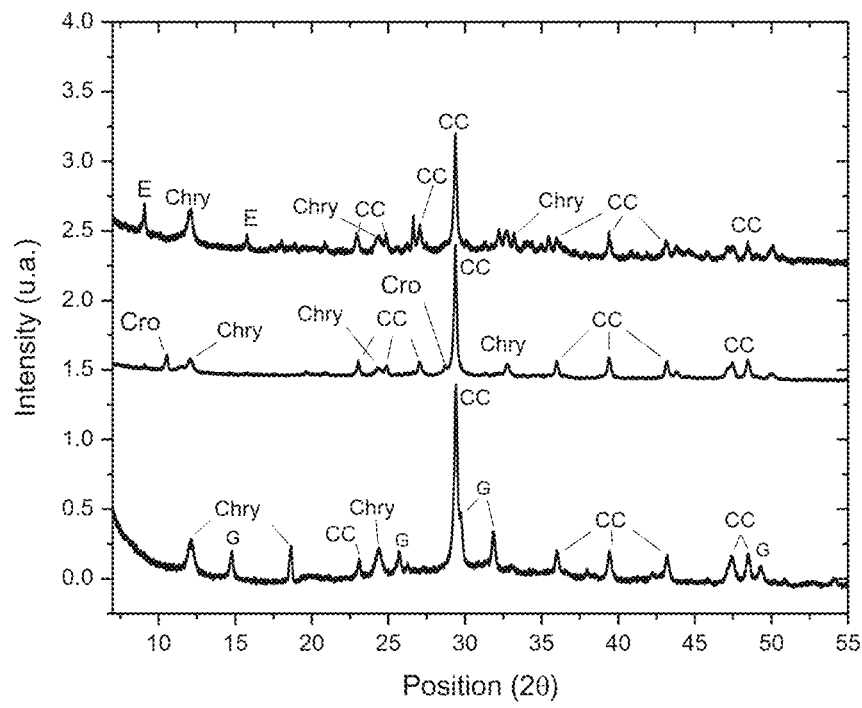
FIG. 1 represents the X-ray diffractograms of the three asbestos wastes.

FIG. 1 represents the diffractogram of the $1^{st}$, $2^{nd}$ and $3^{rd}$ wastes.

The upper diffractogram is that of the $1^{st}$ waste, the intermediate diffractogram is that of the $2^{nd}$ waste and the lower difractogram is that of the $3^{rd}$ waste.

In these three diffractograms, the characteristic diffraction peaks of the chrysotile, crocidolite, calcium carbonate ($CaCO_3$), the cement matrix (ettringite of formula $Ca_6Al_2(SO_4)_3(OH)_{12},26H_2O$) and of gypsum are respectively signaled by the annotations: «Chry», «Cro», «CC», «E» and «G».

As regards the presence of asbestos, the diffractogram of the $1^{st}$ waste has only the characteristic peaks of the chrysotile (in particular at 12.05° and at 24.30° in 2θ), the diffractogram of the $2^{nd}$ waste has the characteristic peaks of the chrysotile and crocidolite (in particular at 28.76°) and the diffractogram of the $3^{rd}$ waste has only the peaks of the chrysotile.

The three wastes have also been analyzed by scanning electron microscopy using an electronic microscope of the type FEI Quanta 200 FEG equipped with a vacuum secondary electrons detector. The acceleration voltage was 15 kV. This analysis has been coupled with an energy dispersive analysis (EDS) for the chemical identification of the different phases.

These analyses have allowed determining that:
- the $1^{st}$ waste (roof tile) contained only the chrysotile;
- the $2^{nd}$ waste (hose gasket) contained a mixture of the chrysotile and an amphibole: crocidolite;
- the $3^{rd}$ waste contained the chrysotile and fibers of amorphous, non-crystallized alkaline earth silicates.

Because the three wastes contained a chrysotile, they have been subjected to an acid treatment which consisted in immersing them in a 1 L reactor which contained a nitric acid solution at a concentration of 4 mol/L and in maintaining the reactive medium thus obtained under stirring at a temperature of 80° C. for a 7 day time period.

The treatment in the acid medium has allowed reducing by 90% the mass of the three asbestos cement wastes.

A chemical analysis by X-ray fluorescence spectrometry of the solid and of the acid solution collected after the acid treatment has allowed establishing the material balance which is detailed in Table 1 hereinbelow:

TABLE 1

Material balance: evolution of the chemical compositions before and after treatment in the acid medium

| Samples | % Mg | % Al | % Si | % Ca | % Fe |
|---|---|---|---|---|---|
| $1^{st}$ waste | 15 | 8 | 34 | 37 | 5 |
| Acid solution | 2 | 22 | 0 | 65 | 12 |
| Remaining solid | 0 | 0 | >98 | 0 | 0 |
| $2^{nd}$ waste | 10 | 6 | 25 | 52 | 8 |
| Acid solution | 1 | 18 | 0 | 68 | 13 |
| Remaining solid | 1 | 0 | 93 | 0 | 6 |
| $3^{rd}$ waste | 4 | 7 | 15 | 69 | 5 |
| Acid solution | 7 | 10 | 0 | 79 | 4 |
| Remaining solid | 0 | 0 | >99 | 0 | 0 |

The chemical analysis by X-ray fluorescence spectrometry has been carried out using a spectrophotometer commercialized by the company PANalytical under the commercial name «Epsilon $3^X$» and which was equipped with a silver tube (under 30 kV and 3 mA) and different filters (Ag, Al and Ti).

With regards to the detailed results in Table 1, it is observed that the acid solutions on completion of the acid treatment contain calcium, iron, magnesium and aluminum. The cement matrix has been dissolved. From the waste before the treatment, silicon is the only element that has not been dissolved. It is present in the remaining solid on completion of the acid treatment.

In addition, the chemical analysis of the $1^{st}$ waste (roof tile) after the acid treatment shows that the cement matrix has been dissolved and that the chrysotile has been transformed.

As regards the $2^{nd}$ waste (hose gasket), the chemical composition of the solution after the acid treatment is similar to that obtained after this treatment on the $1^{st}$ waste, but in the solid, iron and magnesium remain indicating that the amphibole (crocidolite) has not been dissolved by the acid treatment.

As regards the $3^{rd}$ waste (flocking), the chemical composition of the remaining solid shows that the gypsum matrix, as well as the fibers of amorphous alkaline earth silicates have been dissolved and that the chrysotile has been transformed into pure silica.

The solids of the three wastes collected on completion of the acid treatment have been subjected to an X-ray diffractometry analysis.

Figure 2:
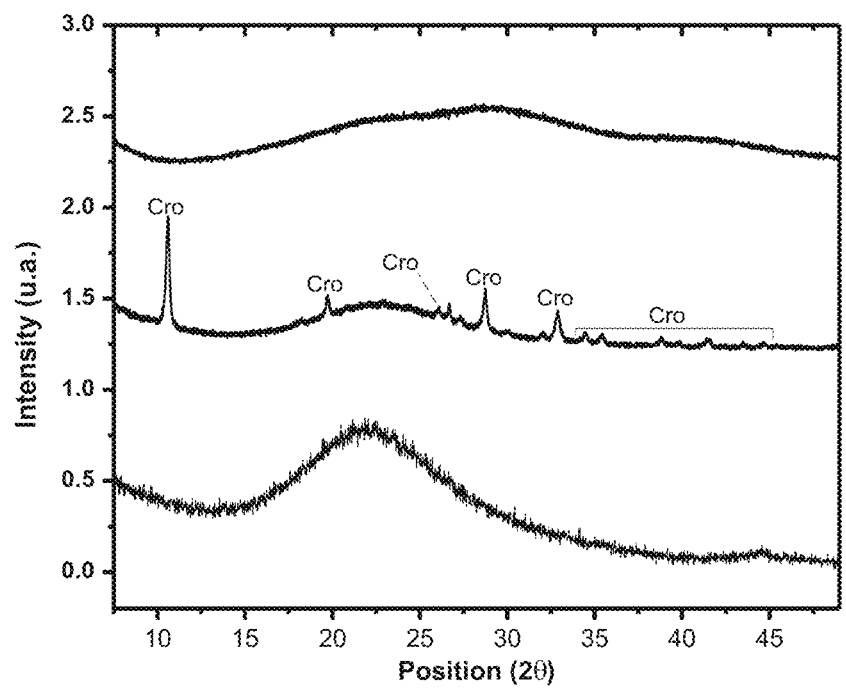
FIG. 2 represents the X-ray diffractograms of the solids collected on completion of the acid treatment of the three asbestos wastes.

FIG. 2 represents the diffractograms of the solids collected on completion of the acid treatment of the $1^{st}$ $2^{nd}$ waste and $3^{rd}$ waste.

The upper diffractogram is that of the solid of the $1^{st}$ waste, the intermediate diffractogram is that of the solid of the $2^{nd}$ waste and the lower diffractogram is that of the solid of the $3^{rd}$ waste.

In the $2^{nd}$ diffractogram, the characteristic diffraction peaks of crocidolite are signaled by the annotation: «Cro».

With regards to the diffractograms represented in FIG. 2, there is observed:
- the absence of the characteristic peak of the chrysotile in the three diffractograms of the solids derived from the three wastes;
- the presence of the characteristic peaks of crocidolite in the diffractogram of the solid of the $2^{nd}$ waste.

This shows that the acid treatment eliminates the chrysotile but not the amphibole in an asbestos waste.

The solution resulting from the acid treatment mainly contains the $Fe^{3+}$, $Mg^{2+}$, $Al^{3+}$ and $Ca^{2+}$ ions. These ions can be selectively precipitated by addition of soda (NaOH) or potash (KOH) according to successive precipitation/filtering sequences at the following pH values: 1.2±0.3; 3±0.3; 10.4±0.3 and 12.4±0.3 to respectively collect the $Fe^{3+}$, $Al^{3+}$, $Mg^{2+}$ and $Ca^{2+}$ ions in the form of hydroxides $Fe(OH)_3$, $Al(OH)_3$, $Mg(OH)_2$ and $Ca(OH)_2$. After having collected the aforementioned ions, the final solution contains either sodium nitrate ($NaNO_3$) in the case of a neutralization with soda (this nitrate may be used for the synthesis of nitratecancrinite), or potassium nitrate ($KNO_3$) in the case of a neutralization with potash (this nitrate may be used in agriculture).

As explained hereinabove, the structure of the chrysotile has been destructed by dissolution of the brucite layer, $Mg(OH)_2$. The dissolution of the brucite layer is due to the structure of the chrysotile which makes this layer accessible to an acid solvent. However, the acid treatment does not destroy the amphibole because of its structure: the octahedron soluble layer $MO_6$ is confined between two layers of $SiO_2$ which are insoluble in an acid solution.

A base treatment consisting in the immersion of the solid of the $2^{nd}$ waste (collected on completion of the acid treatment) in a NaOH solution at a concentration of 10 mol/L and heated to a temperature of 180° C. in a 50 mL autoclave has been performed for a 5 day time period.

Furthermore, this same base treatment has been applied to samples of pure crocidolite and amosite.

All the solids subjected to this base treatment have been completely dissolved and base solutions have been obtained which have been analyzed by X-ray fluorescence spectrometry.

Table 2 details the chemical analyses by X-ray fluorescence spectrometry of the residual solutions after the base treatment.

TABLE 2

X-ray fluorescence spectrometry analyses of the solutions after the base treatment

| Samples | Na | Mg | Si | Fe |
|---|---|---|---|---|
| Crocidolite solution | 82% | 1% | 15% | 1% |
| Amosite solution | 83% | 0% | 16% | 1% |
| $2^{nd}$ waste solution | 81% | 0% | 18% | 1% |

With regards to Table 2, it is observed that the composition of the solutions for dissolving the pure amphiboles (crocidolite and amosite) is similar to the composition of the solution obtained after the dissolution of the solid of the $2^{nd}$ waste thus showing the total destruction thereof. Silicon is present in the base solutions obtained on completion of the base treatment. These results prove that the base treatment completely destroys the asbestos of the amphiboles group.

Moreover, the mesoporous silica obtained on completion of the acid treatment applied on the $1^{st}$ waste (that is to say the tile) has been collected by filtering and used for the synthesis of a nitrate-cancrinite type zeolite.

This zeolite has been synthesized in the following manner:

The following precursors have been provided:
silicon precursor: 3.09 g of the mesoporous silica obtained on completion of the acid treatment on the $1^{st}$ waste;
aluminum precursor: 1.64 g of $Al_2O_3.Na_2O$;
sodium nitrate precursor: 29.01 g of $NaNO_3$;
4.36 g of NaOH.

In a $1^{st}$ beaker filled with 35 mL of distilled water, NaOH, the mesoporous silica and then after a few minutes $NaNO_3$, have been added in the that order.

In a $2^{nd}$ beaker, $Al_2O_3.Na_2O$ has been dissolved in 5 mL of distilled water.

The two mixtures have been added in a $3^{rd}$ vessel. An instantaneous gelation occurs. The vessel has been closed and stirred very strongly.

Afterwards, this vessel is placed in the oven at a temperature of 90° C. for one day. Then filtering with a cellulose-based filter-paper and washing with distilled water have been performed. The product thus obtained, which was a nitrate-cancrinite type zeolite, has been dried.

Figure 3:
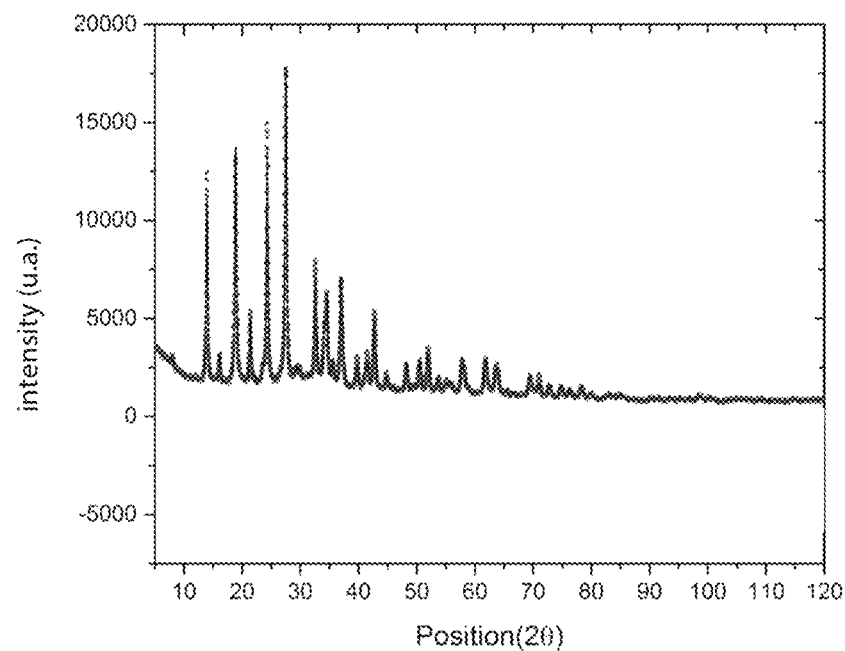
FIG. 3 represents the X-ray diffractogram of the nitrate-cancrinite obtained from one of the asbestos wastes.

Indeed, its X-ray diffractogram is represented in FIG. 3, as well as that of the structural model of the nitrate-cancrinite (that is to say the «theoretical» or also so-called «calculated» diffractogram). It is observed that the two diffractograms almost superimpose one another. This is confirmed by the fact that we have an $X^2$ factor equal to 5.3 which is an excellent value in crystallography. Thus, FIG. 3 shows the excellent purity of the product thus synthesized with a very good compliance with the structural model.

II—Experiments for Treating a Chrysotile Waste:

In a $2^{nd}$ series of experiments, a pure chrysotile waste has been treated by firstly subjecting it to an acid treatment by immersion in a nitric acid solution with a concentration of 4 mol/L for 7 days at 80° C.

Figure 4:
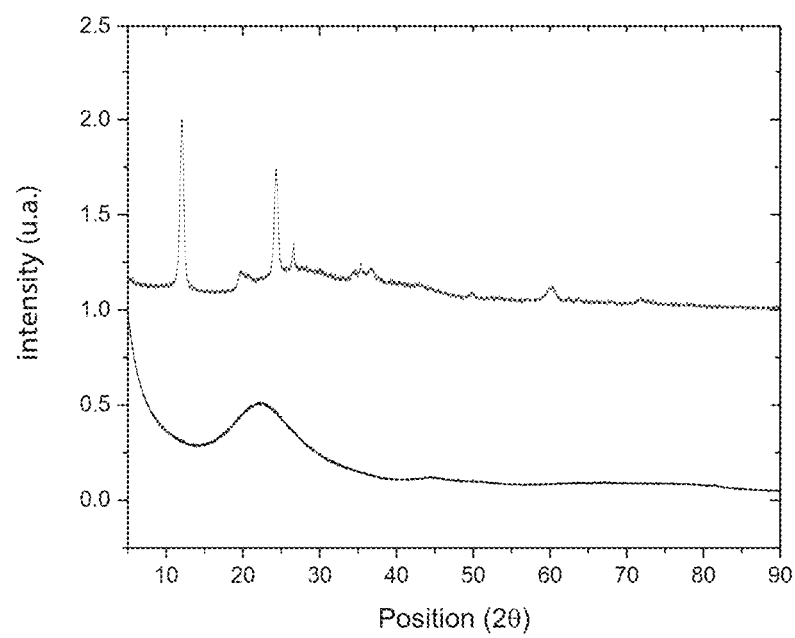
FIG. 4 represents the X-ray diffractograms of a chrysotile waste before and after the acid treatment.

FIG. 4 represents the X-ray diffractograms:
of the chrysotile waste before the acid treatment (upper diffractogram);
of the chrysotile waste after the acid treatment (lower diffractogram).

In the upper diffractogram, there are observed the characteristic diffraction peaks of the chrysotile which are absent in the lower diffractogram which features a large characteristic diffusion peak of an amorphous compound.

Thus, on completion of the acid treatment on the chrysotile, a mesoporous silica is obtained which is an amorphous (that is to say non-crystallized) silica. The crystalline structure of the chrysotile has disappeared on completion of this treatment.

A porosity analysis has been performed on the silica thus obtained:
specific surface area: 455 m²/g;
pore volume: 0.37 cm³/g;
pore diameter: 3.2 nm.

Afterwards, the mesoporous silica has been separated from the acid solution by filtering and subjected to a thermal treatment.

The thermal treatment has consisting in submitting the mesoporous silica to the following temperatures: 200° C., 600° C., 700° C. and 800° C.

A thermogravimetric analysis has been performed with an equipment of the type Netzsch STA449F from 25° C. to 1400° C. with a heating rate of 5° C./min under an argon stream.

Figure 5:
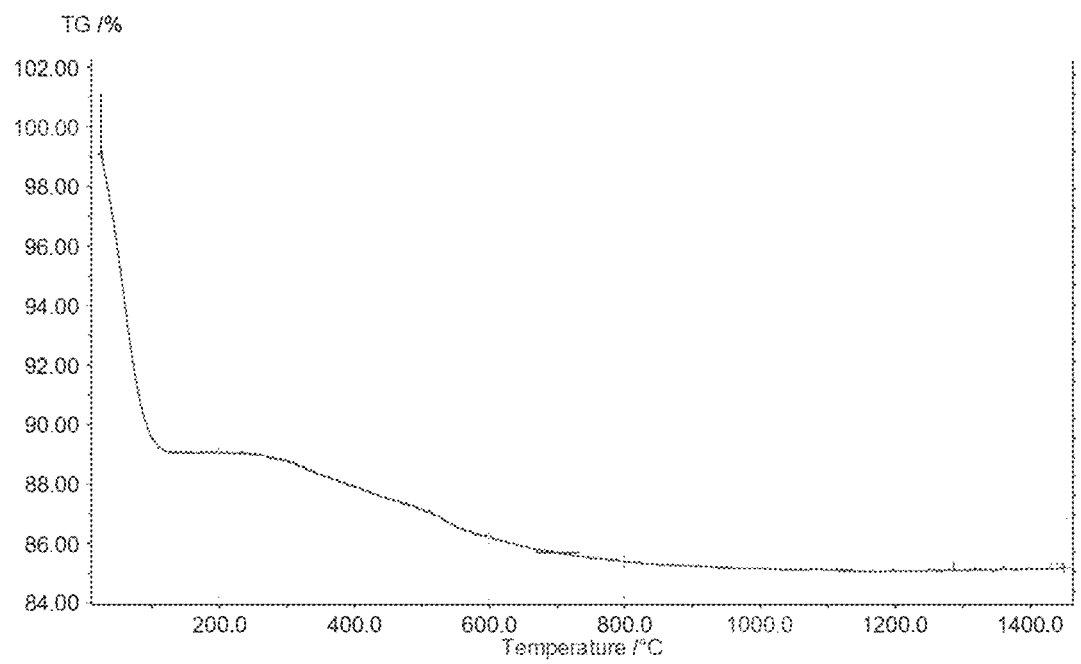
FIG. 5 represents the thermogravimetric analysis of the hydrated mesoporous silica obtained after the acid treatment.

FIG. 5 represents the record of the thermogravimetric analysis. There is observed an abrupt loss of mass up to 100° C. which corresponds to the elimination of «free» water. The loss of mass between 100° C. and 600° C. corresponds to the loss of water «bonded» to the siliceous framework of the nanotubes. This loss of water is accompanied by a progressive rearrangement of the $SiO_4$ tetrahedrons therebetween. This rearrangement causes a crystallization of the walls of the nanotubes as of 700° C. and a loss of the porosity of the walls by their condensation.

Figure 6:
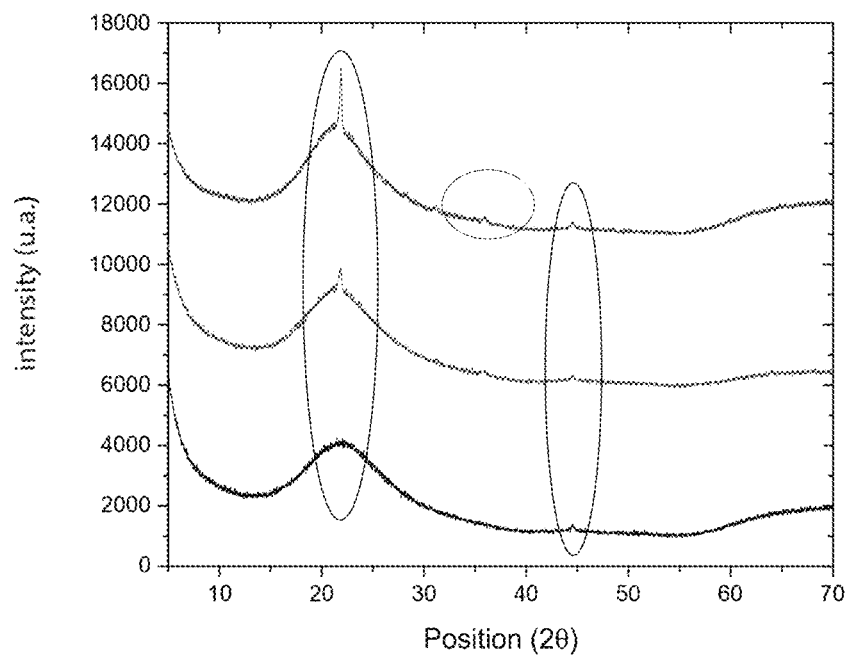
FIG. 6 represents the X-ray diffractograms of the mesoporous silica after thermal treatment at different temperatures.

FIG. 6 represents the X-ray diffractograms of the mesoporous silica after the thermal treatment at:
600° C. (lower diffractogram);
700° C. (intermediate diffractogram);
800° C. (upper diffractogram).

It is observed that at 600° C., the silica is still amorphous (there is no diffraction peak). As of 700° C., crystallization peaks of a cristobalite-type crystallized phase of the silica start appearing.

Table 3 below details the specific surface area, the size of the pores and the pore volume of the mesoporous silica before the thermal treatment, then after the thermal treatment at 200° C., 600° C. and 800° C. Each of the thermal treatments has been performed in a furnace commercialized by the company CARBOLITE GERO under the commercial name «CWF», and that for 10 hours.

TABLE 3

Specific surface area, size of the pores and pore volume
of the silica before and after the thermal treatment

| | Specific surface area ($m^2/g$) | Size of the pores (nm) | Pore volume ($cm^3/g$) |
|---|---|---|---|
| After the acid treatment | 455 | 3.23 | 0.37 |
| After the thermal treatment at 200° C. | 418 | 3.5 | 0.37 |
| After the thermal treatment at 600° C. | 208 | 5.2 | 0.27 |
| After the thermal treatment at 800° C. | 174 | 5.3 | 0.21 |

With regards to Table 3, it is observed that the volume of the pores and the specific surface area decrease while the diameter of the pores increases with the treatment temperature.

These results show that the walls of the silica nanotubes are rebuilt by condensing as explained hereinabove. Indeed, during the acid treatment, the brucite layers are eliminated; which leaves large spaces between the silica sheets which constitute the wall of the tubes. The tubes have a 3.2 nm diameter but with barely structured walls and therefore a considerable specific surface area (surface developed by non-contiguous sheets) and a large pore volume. When the temperature is increased, these sheets reconnect together with the formation of $SiO_4$ tetrahedrons; which results in a decrease in the specific surface area, the total volume also decreases and the center of the tube (diameter of the tube) increases.

The invention claimed is:

1. A method for destructing and valorizing an asbestos waste, comprising:
    a) determining asbestos mineralogical group(s) contained in said waste, said group comprising a chrysotile and an amphibole,
    b) performing at least one treatment on said asbestos waste, said treatment being:
    an acid treatment when the asbestos waste comprises only a chrysotile, said acid treatment comprising in the immersion of the asbestos waste in a strong acid solution, at a temperature of at most 100° C., so as to obtain an acid solution and a solid comprising a mesoporous silica,
    a base treatment when the asbestos waste comprises only an amphibole, said base treatment consisting in the immersion of the asbestos waste in a solution of a strong base in a hermetically sealed medium so as to obtain a base solution containing dissolved silica,
    said acid treatment followed by said base treatment when the asbestos waste comprises a mixture of a chrysotile and an amphibole, so as to obtain after said acid treatment an acid solution and a solid mixture containing a mesoporous silica and the unaltered amphibole, said solid mixture being separated from the acid solution to be subjected to said base treatment so as to obtain a base solution containing dissolved silica, and
    c) valorizing at least one of the products obtained on completion of step b) of the treatment.

2. The destruction and valorization method according to claim 1, wherein the asbestos waste is an asbestos cement waste or a gypsum-based asbestos flocking.

3. The destruction and valorization method according to claim 1, wherein the acid treatment when the asbestos waste comprises only a chrysotile is followed by a thermal treatment comprising a heating of the mesoporous silica at a temperature of at least 600° C.

4. The destruction and valorization method according to claim 1, wherein when an acid treatment has been performed, step c) comprises using the mesoporous silica for the entrapment or the filtering of molecules and/or as a silicon precursor for the synthesis of a zeolite.

5. The destruction and valorization method according to claim 4, wherein when the acid solution is a nitric acid solution, the mesoporous silica is used to synthesize a nitrate-cancrinite type zeolite of formula Na8[Al6Si6O24] (NO3)2-4H2O.

6. The destruction and valorization method according to claim 1, wherein when an acid treatment has been performed, step c) comprises selectively extracting or isolating ions present in the acid solution obtained on completion of the acid treatment.

7. The destruction and valorization method according to claim 1, wherein when a base treatment has been performed, step c) comprises in using the base solution obtained on completion of the base treatment for the production of a hydrated calcium silicate type material and/or for the synthesis of a zeolite.

8. The destruction and valorization method according to claim 1, wherein the acid solution contains at least one strong monoacid selected from nitric acid and hydrochloric acid.

9. The destruction and valorization method according to claim 1, wherein the strong base of the base solution is selected from soda and potash.

* * * * *